United States Patent
Masui et al.

(10) Patent No.: US 11,092,216 B2
(45) Date of Patent: Aug. 17, 2021

(54) SPEED REDUCTION RATIO AUTOMATIC SWITCHING DEVICE

(71) Applicant: SMC CORPORATION, Chiyoda-ku (JP)

(72) Inventors: Ryuichi Masui, Bando (JP); Naohiro Ishizawa, Tsukubamirai (JP)

(73) Assignee: SMC CORPORATION, Chiyoda-ku (JP)

(*) Notice: Subject to any disclaimer, the term of this patent is extended or adjusted under 35 U.S.C. 154(b) by 0 days.

(21) Appl. No.: 16/577,383

(22) Filed: Sep. 20, 2019

(65) Prior Publication Data
US 2020/0096080 A1   Mar. 26, 2020

(30) Foreign Application Priority Data

Sep. 25, 2018  (JP) .............................. JP2018-178335

(51) Int. Cl.
| | | |
|---|---|---|
| *F16H 3/54* | (2006.01) | |
| *F16H 61/02* | (2006.01) | |
| *H02K 7/116* | (2006.01) | |

(52) U.S. Cl.
CPC ............... *F16H 3/54* (2013.01); *F16H 61/02* (2013.01); *F16H 2200/2005* (2013.01)

(58) Field of Classification Search
CPC .... F16H 3/54; F16H 61/02; F16H 2200/2005; F16H 2025/2087; H02K 7/116
See application file for complete search history.

(56) References Cited

U.S. PATENT DOCUMENTS 5,358,456 A * 10/1994 Deppert .................. F02B 67/04
                                                        475/154
7,220,205 B2 * 5/2007 Nagai ....................... F16H 3/54
                                                        475/91
(Continued)

FOREIGN PATENT DOCUMENTS

JP    2001-153191 A    6/2001
JP       4899082 B2    3/2012
(Continued)

OTHER PUBLICATIONS

Machine translation of JP201844466, filed Sep. 27, 2020 (Year: 2020).*

(Continued)

*Primary Examiner* — Tisha D Lewis
(74) *Attorney, Agent, or Firm* — Oblon, McClelland, Maier & Neustadt, L.L.P.

(57) ABSTRACT

A speed reduction ratio automatic switching device includes a planetary gear mechanism. The planetary gear mechanism includes a sun gear provided for an input shaft, planetary gears in mesh with an outer circumferential side of the sun gear, an internal gear in mesh with an outer circumferential side of the planetary gears, and first and second carriers made of a semi-rigid magnetic material. The first and second carriers support the planetary gears in a rotatable manner, and rotate together with the planetary gears along with revolution of the planetary gears. Each of the sun gear, the planetary gears and the internal gear is a helical gear. First and second magnets for generating a thrust force in an axial direction are provided between the first and second carriers and the internal gear.

7 Claims, 6 Drawing Sheets

(56) References Cited

U.S. PATENT DOCUMENTS

| | | | |
|---|---|---|---|
| 7,298,108 B2* | 11/2007 | Nagai | B25J 9/1674 |
| | | | 192/141 |
| 2005/0272548 A1 | 12/2005 | Nagai et al. | |
| 2006/0102697 A1 | 5/2006 | Nagai et al. | |
| 2009/0058214 A1* | 3/2009 | Mizushima | H02K 7/116 |
| | | | 310/203 |
| 2009/0251021 A1* | 10/2009 | Atarashi | H02K 1/2793 |
| | | | 310/156.07 |
| 2017/0040880 A1* | 2/2017 | Ando | H02K 7/116 |
| 2017/0114919 A1* | 4/2017 | Ohashi | F16H 35/10 |

FOREIGN PATENT DOCUMENTS

| | | | | |
|---|---|---|---|---|
| JP | 2018044466 A * | 3/2018 | | F02N 15/06 |
| RU | 2545509 C2 * | 4/2015 | | H02K 21/00 |
| WO | WO-2012000487 A1 * | 1/2012 | | F16H 55/36 |
| WO | WO 2013/157986 A1 | 10/2013 | | |

OTHER PUBLICATIONS

Extended European Search Report dated Dec. 11, 2019 in European Patent Application No. 19198744.5, citing documents AA, AO and AP therein, 7 pages.

* cited by examiner

SPEED REDUCTION RATIO AUTOMATIC SWITCHING DEVICE

CROSS-REFERENCE TO RELATED APPLICATION

This application is based upon and claims the benefit of priority from Japanese Patent Application No. 2018-178335 filed on Sep. 25, 2018, the contents of which are incorporated herein by reference.

BACKGROUND OF THE INVENTION

Field of the Invention

The present invention relates to a speed reduction ratio automatic switching device capable of, at the time of transmitting a driving force to an output shaft with speed reduction, automatically switching the speed reduction ratio.

Description of the Related Art

In Japanese Patent No. 4899082, the applicant of the present application proposes a speed reduction ratio automatic switching device having a planetary gear mechanism in a housing. This speed reduction ratio automatic switching device is provided between a rotary drive source and an actuator. An input shaft of the speed reduction ratio automatic switching device is coupled to the rotary drive source, and an output shaft of the speed reduction ratio automatic switching device is coupled to the actuator. A sun gear provided for the input shaft is in mesh with three planetary gears which are in mesh with an internal gear in the housing. Further, viscous resisting substance for generating a thrust force is provided between the internal gear and the planetary gears.

Then, a rotational force inputted from the rotary drive source to the input shaft is transmitted to the planetary gears through the sun gear, and the planetary gears revolve around the sun gear on the inner circumferential side of the internal gear. As a result, carriers provided with the planetary gears and having the output shaft are rotated. In this regard, since viscous resisting substance is provided between the planetary gears and the internal gear, viscous resistance is produced between the planetary gears and the internal gear. Therefore, in the case where a load in excess of a predetermined torque is applied to the carriers, based on the rotational speed difference between the internal gear and the carriers, the internal gear moves in the input shaft direction or the output shaft direction, and the speed reduction ratio outputted from the output shaft is switched automatically.

SUMMARY OF THE INVENTION

A general object of the present invention is to provide a speed reduction ratio automatic switching device capable of switching the speed reduction ratio of the outputted rotational driving force at a suitable switching point without any changes of the switching point regardless of the ambient environment or the number of driving rotations.

According aspect of the present invention, a speed reduction ratio automatic switching device capable of automatically switching a rotational driving force inputted to an input shaft at a predetermined speed reduction ratio to output the switched rotational driving force from an output shaft is provided. The speed reduction ratio automatic switching device includes a planetary gear mechanism, a resisting element, and a braking element, and the planetary gear mechanism includes a sun gear provided for the input shaft, a planetary gear in mesh with an outer circumferential side of the sun gear, an internal gear in mesh with an outer circumferential side of the planetary gear, and a carrier made of a hysteresis material, the carrier is coupled to the output shaft, configured to support the planetary gear in a rotatable manner, and rotate together with the planetary gear along with revolution of the planetary gear. The resisting element is configured to generate a thrust force in an axial direction between the internal gear and the carrier, and the braking element is configured to restrict rotation of the internal gear when the internal gear moves in the axial direction by the thrust force, as a result of a change of output load applied to the output shaft, wherein each of the sun gear, the planetary gear, and the internal gear comprises a helical gear, and the resisting element comprises a magnet provided between the internal gear and the carrier.

In the present invention, the planetary gear mechanism of the speed reduction ratio automatic switching device is made up of the sun gear provided for the input shaft, the planetary gear in mesh with the outer circumferential side of the sun gear, the internal gear in mesh with the outer circumferential side of the planetary gear, and the carrier coupled to the output shaft, configured to support the planetary gear in a rotatable manner, and rotate together with the planetary gear along with revolution of the planetary gear, wherein each of the sun gear, the planetary gear, and the internal gear is a helical gear, and the resisting element which generates a thrust force in the axial direction between the carrier made of a hysteresis material and the internal gear is provided. The resisting element is a magnet provided between the internal gear and the carrier made of a hysteresis material.

Therefore, in the case where a load in excess of a predetermined hysteresis torque is applied to the carrier made of a hysteresis material, the internal gear moves toward the input shaft or the output shaft based on the relative rotation difference between the internal gear and the carrier, and the internal gear is locked up, and fixed. In this manner, it is possible to automatically switch the speed reduction ratio of the rotational driving force.

As a result, in comparison with the conventional speed reduction ratio automatic switching device where the viscous resisting substance such as viscous oil or grease is used between the planetary gears and the carriers, and between the planetary gears and the internal gear, since the magnetic braking force between of the magnet and the carrier is utilized, changes of the temperature, etc. in the ambient environment and performance changes due to degradation over time, etc. do not occur. Accordingly, it becomes possible to perform switching of the speed reduction ratio over the years at the stable switching point.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
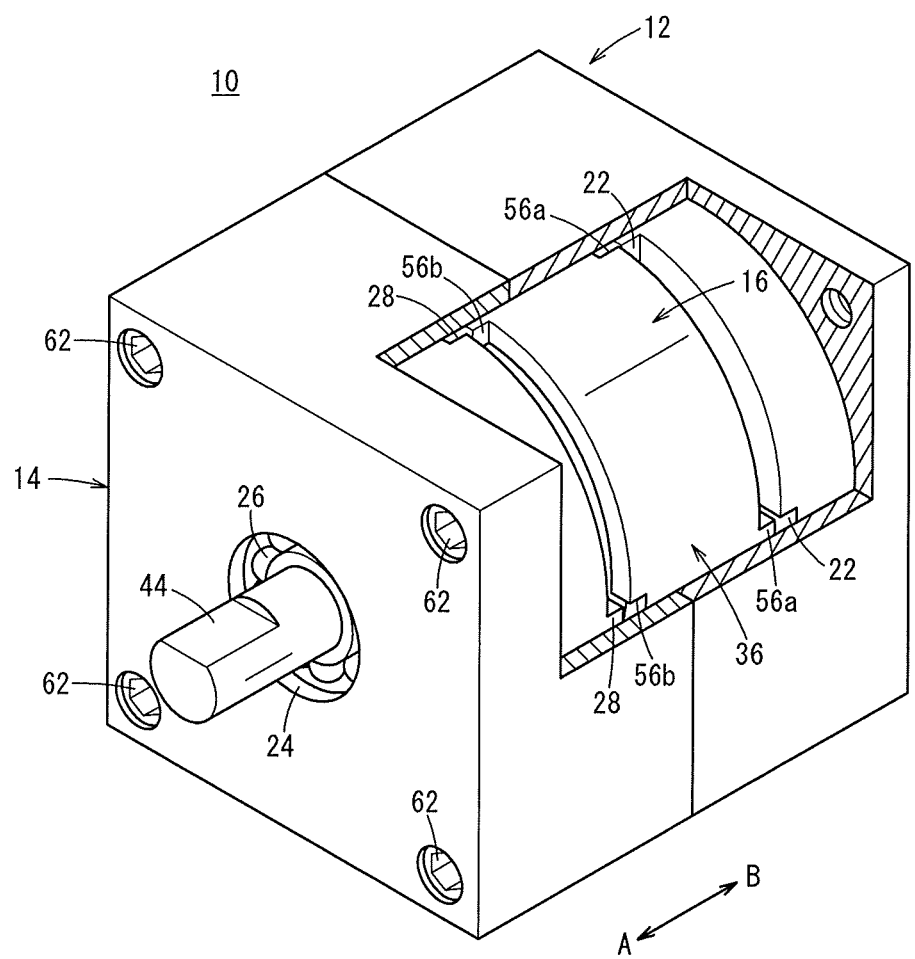
FIG. 1 is a perspective view with partial cutaway, showing a speed reduction ratio automatic switching device according to an embodiment of the present invention.
Figure 2:
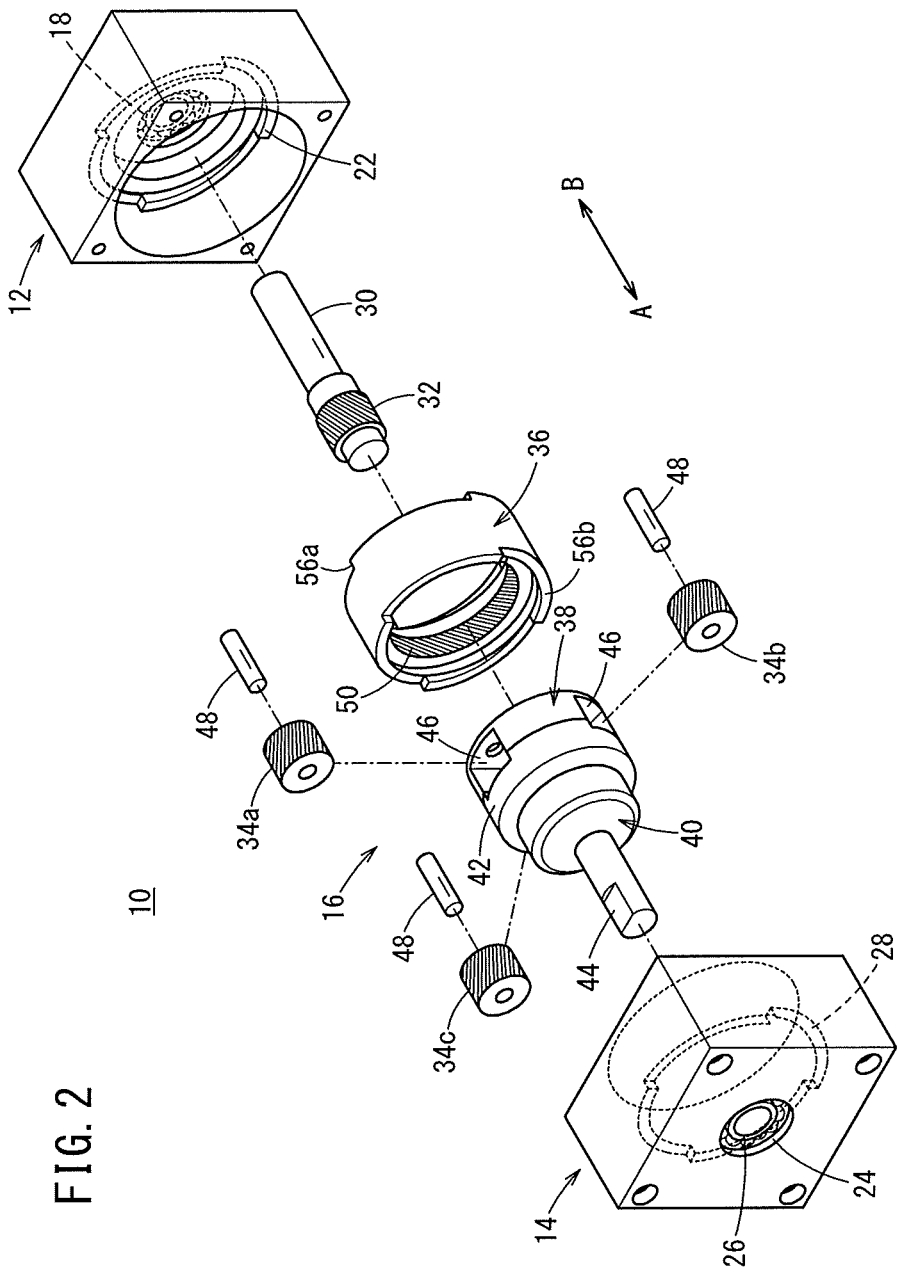
FIG. 2 is an exploded perspective view showing a speed reduction ratio automatic switching device shown in FIG. 1.
Figure 3:
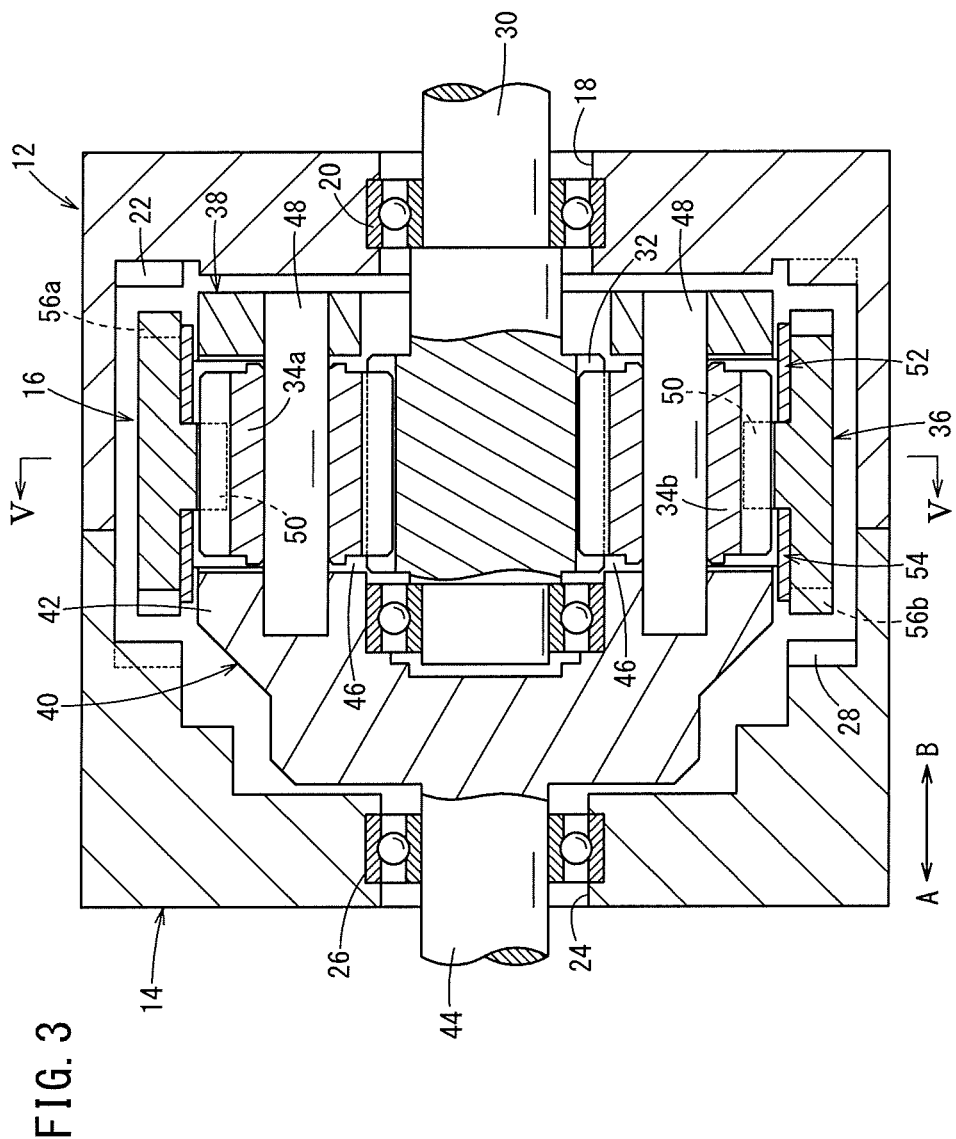
FIG. 3 is an overall cross sectional view showing the speed reduction ratio automatic switching device shown in FIG. 1.

A speed reduction ratio automatic switching device 10 shown in FIGS. 1 to 3 includes first and second housings (housings) 12, 14 which can be divided in axial directions (directions indicated by arrows A and B), and a planetary gear mechanism 16 stored in the first and second housings 12, 14.

For example, the first housing 12 is made of metal, and has a rectangular shape in cross section. A first shaft hole 18 is formed at the center of one end of the first housing 12, and an input shaft 30 described later is inserted into the first shaft hole 18. A first bearing 20 is provided in an inner circumferential surface of the first shaft hole 18 to support the input shaft 30 in a rotatable manner.

Further, a first lock (lock) 22 is formed inside the first housing 12, in an inner wall surface of the first housing 12 facing the second housing 14. The first lock 22 can be engaged with an internal gear lock receiver (internal gear clutch) 56a of an internal gear 36 described later. The first lock 22 has a circular arc shape, and protrudes in a manner that the height of the first lock 22 is increased gradually toward the second housing 14 (in the direction indicated by the arrow A) (see FIG. 4). It should be noted that, in the case where the internal gear 36 described later is translated toward one end in an axial direction (direction indicated by the arrow B, the direction of the input shaft 30), the internal gear lock receiver 56a is engaged with the first lock 22.

As in the case of the first housing 12, the second housing 14 has a rectangular shape in cross section. A second shaft hole 24 is formed at the center of the other end of the second housing 14, and an output shaft 44 described later is inserted into the second shaft hole 24. A second bearing 26 is provided in an inner circumferential surface of the second shaft hole 24 to support the output shaft 44 in a rotatable manner.

Further, a second lock (lock) 28 is formed inside the second housing 14, in an inner wall surface of the second housing 14 facing the first housing 12. The second lock 28 can be engaged with an internal gear lock receiver (internal gear clutch) 56b of the internal gear 36 described later. In the same manner as in the case of the first lock 22, the second lock 28 has a circular shape, and protrudes toward the first housing 12 (in the direction indicated by the arrow B) in a manner that the height of the second lock 28 is increased gradually. It should be noted that, in the case where the internal gear 36 described later is translated toward the other end (in the direction indicated by the arrow A, the direction of the output shaft 44), the internal gear lock receiver 56b is engaged with the second lock 28.

As shown in FIGS. 1 to 3 and 5, the planetary gear mechanism 16 includes a sun gear 32 formed at an end of the input shaft 30, three planetary gears 34a, 34b, 34c provided concentrically with the sun gear 32, spaced from one another at an angle of about 120°, in mesh with the sun gear 32 to revolve around the sun gear 32 and rotate on their own axes, the internal gear 36 provided around the planetary gears 34a, 34b, 34c, and a pair of first and second carriers (carriers) 38, 40 holding the planetary gears 34a, 34b, 34c.

The sun gear 32 is a helical gear formed at the other end of the input shaft 30, and the input shaft 30 is coupled to a rotary drive shaft of a rotary drive source (not shown) through a coupling member (not shown).

For example, first and second carriers 38, 40 are made of a semi-rigid magnetic material (hysteresis material), and dividable into two parts in axial directions (directions indicated by the arrows A and B). The first and second carrier 38, 40 include a cylindrical inner part 42 having a large diameter, and the output shaft 44 protruding from the other end of the inner part 42 in the axial direction (indicated by the arrow A). The inner part 42 is provided to bridge between the first carrier 38 and the second carrier 40. The output shaft 44 is formed in the second carrier 40. It should be noted that, for example, the semi-rigid magnetic material has coercivity in the range of 10 to 100 Oe (800 to 8000 A/m).

Further, three gear storage holes 46 spaced from one another at equal angles of 120° along the circumferential direction are opened in the inner part 42, and the planetary gears 34a, 34b, 34c are inserted into the gear storage holes 46, respectively.

Further, the outer circumferential surface of the inner part 42 made up of the first and the second carrier 38, 40, has a substantially constant diameter in the axial directions (indicated by the arrows A and B).

The output shaft 44 is provided coaxially with the input shaft 30 at the center of the other end of the inner part 42, and inserted into the second shaft hole 24 of the second housing 14. In this manner, the output shaft 44 is supported in a rotatable manner by the second bearing 26 (see FIG. 3).

For example, each of the planetary gears 34a, 34b, 34c has a cylindrical shape having teeth of a helical gear in its outer circumferential surface. The planetary gears 34a, 34b, 34c are inserted into the gear storage holes 46, respectively, in a manner that the axial lines of the planetary gears 34a, 34b, 34c are oriented substantially in parallel with the axial lines of the first and second carriers 38, 40, and the planetary gears 34a, 34b, 34c pivotally supported by the first and second carriers 38, 40 in a rotatable manner using pins 48.

Further, the internal gear 36 having a large diameter is provided on the outer circumferential sides of the planetary gears 34a, 34b, 34c, around the planetary gears 34a, 34b, 34c. Inner teeth 50 of the internal gear 36 described later are in mesh with the planetary gears 34a, 34b, 34c.

For example, the internal gear 36 has an annular shape, and the outer circumferential surface of the internal gear 36 faces the inner surfaces of the first and second housings 12, 14, and has inner teeth 50 formed at the center in the inner circumferential surface, and in mesh with the planetary gears 34a, 34b, 34c. The inner teeth 50 are in the form of a helical gear, and protrude radially inward from the inner circumferential surface of the internal gear 36. Front ends of the inner teeth 50 inserted into the gear storage holes 46 are in mesh with the planetary gears 34a, 34b, 34c, respectively.

Further, a plurality of internal gear lock receivers 56a, 56b are curved and protrude from both ends of the internal gear 36 in the axial direction (indicated by the arrows A and B). The internal gear lock receivers 56a, 56b are protrusions curved in the circumferential direction corresponding to the first and second locks 22, 28 of the first and second housings 12, 14. That is, the inner gear lock receivers 56a, 56b, and the first and second locks 22, 28 function as inner gear lock elements.

Further, the torsion angle of the helical gears of the sun gear 32, the planetary gears 34a, 34b, 34c, and the internal gear 36 is not limited specially, but preferably in the range of 30° to 40°.

Figure 6:
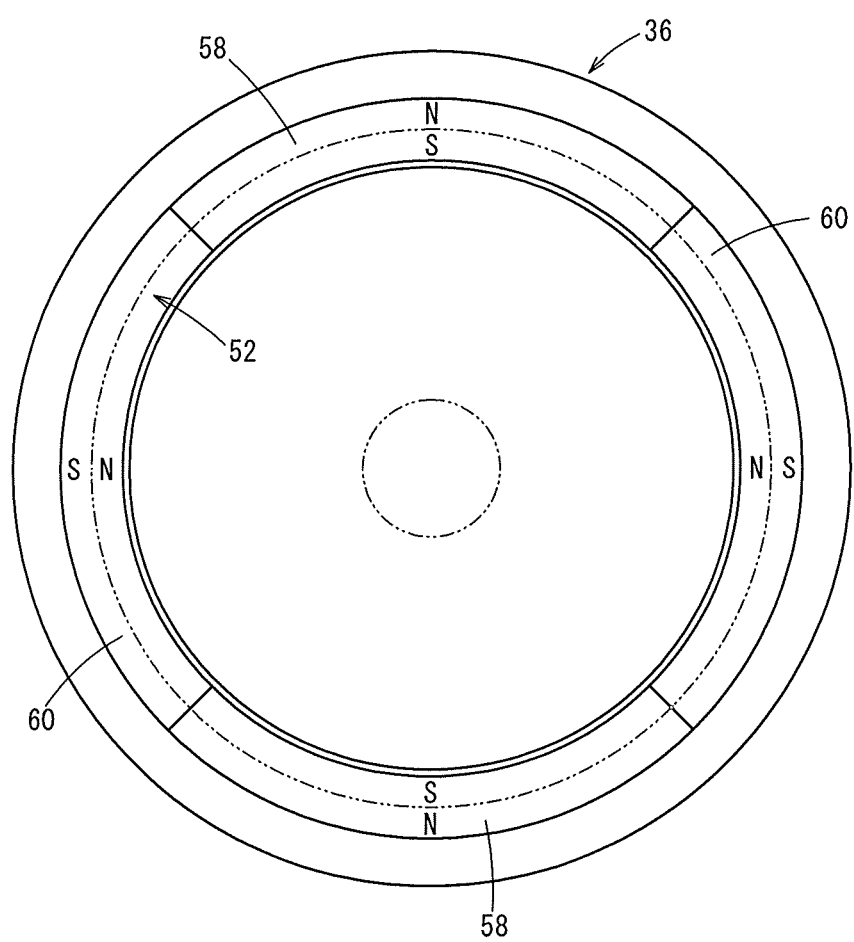
FIG. 6 is a plan view showing the internal gear and a first magnet in FIG. 3, viewed in an axial direction of an input shaft.

First and second magnets 52, 54 are provided on both sides of the inner teeth 50 in the axial direction, in the inner circumferential surface of the internal gear 36, and provided to face the outer circumferential surfaces of the first and second carriers 38, 40, respectively. As shown in FIG. 6, each of the first and second magnets 52, 54 comprises a multipole permanent magnet including first magnet parts 58 each having an inner circumferential side magnetized to the south (S) pole and an outer circumferential side magnetized to the north (N) pole, and second magnet parts 60 each having an inner circumferential side magnetized to the N-pole and an outer circumferential side magnetized to the S-pole. The first magnet parts 58 and the second magnet parts 60 are provided alternately along a circumferential direction.

Each of the first and second magnets 52, 54 has an annular shape formed by arranging the two first magnet parts 58 and the two second magnet parts 60 having a circular shape in cross section alternately adjacent to each other in the circumferential direction. The first and second magnets 52, 54 are fixed to the inner circumferential surface of the internal gear 36 by an adhesive, etc. In this regard, the first and second magnets 52, 54 are provided in the state where clearance having a predetermined interval is formed between the inner circumferential surfaces of the first and second magnets 52, 54 and the outer circumferential surfaces of the first and second carriers 38, 40 (see FIG. 3).

Further, the first and second magnets 52, 54 have substantially the same shape and structure, and are provided in a manner that the magnetic flux of the first and second magnets 52, 54 is oriented in the radial direction. The four permanent magnets are provided in a manner that the S-pole and the N-pole are positioned adjacent to each other.

It should be noted that the first and second magnets 52, 54 are not limited to the case where each of the first and second magnets 52, 54 is made up of the two first magnet parts 58 and the two second magnet parts 60 (four magnet parts in total). The first and second magnets 52, 54 may have a single annular structure magnetized to have different polarities in the circumferential direction, or may have structure where four or more divided magnet parts (the first and second magnet parts 58, 60) are arranged adjacent to each other in the circumferential direction.

The speed reduction ratio automatic switching device 10 according to the embodiment of the present invention basically has the above structure. Next, assembling of the speed reduction ratio automatic switching device 10 will be described briefly.

Firstly, in the state where the first and second carriers 38, 40 are divided in the axial direction, after the three planetary gears 34a, 34b, 34c are inserted into the gear storage holes 46, to support the planetary gears 34a, 34b, 34c in a rotatable manner through the pins 48, the first and second carriers 38, 40 are moved closer to each other in the axial direction, and brought into contact with each other. The first and second carriers 38, 40 are coupled together using tightening bolts (not shown).

Next, the sun gear 32 of the input shaft 30 is inserted into the center of the first carrier 38, and brought into mesh with the planetary gears 34a, 34b, 34c. In this state, the input shaft 30 is inserted into the first shaft hole 18 of the first housing 12 to support the input shaft 30 by the first bearing 20. Further, the output shaft 44 is inserted into the second shaft hole 24 of the second housing 14 to support the output shaft 44 by the second bearing 26. Then, the internal gear 36 is provided on the outer circumferential side of the first and second carriers 38, 40, and the inner teeth 50 of the first and second carriers 38, 40 are brought into mesh with the planetary gears 34a, 34b, 34c.

It should be noted that the first and second magnets 52, 54 are attached to the inner circumferential surface of the internal gear 36 beforehand, and the first and second magnets 52, 54 are positioned to face outer circumferential surfaces of the first and second carriers 38, 40 with clearance having a predetermined interval in the radial direction.

Finally, in the state where the input shaft 30 is inserted into the first housing 12 and the output shaft 44 is inserted into the second housing 14, the first housing 12 and the second housing 14 are moved closer to each other in the axial direction, and brought into contact each other, and then, coupled together by tightening bolts 62 (see FIG. 1) to finish assembling of the speed reduction ratio automatic switching device 10 storing the planetary gear mechanism 16 in the first and second housings 12, 14.

Next, operation of the speed reduction ratio automatic switching device 10 assembled in the manner as described above will be described.

Figure 5:
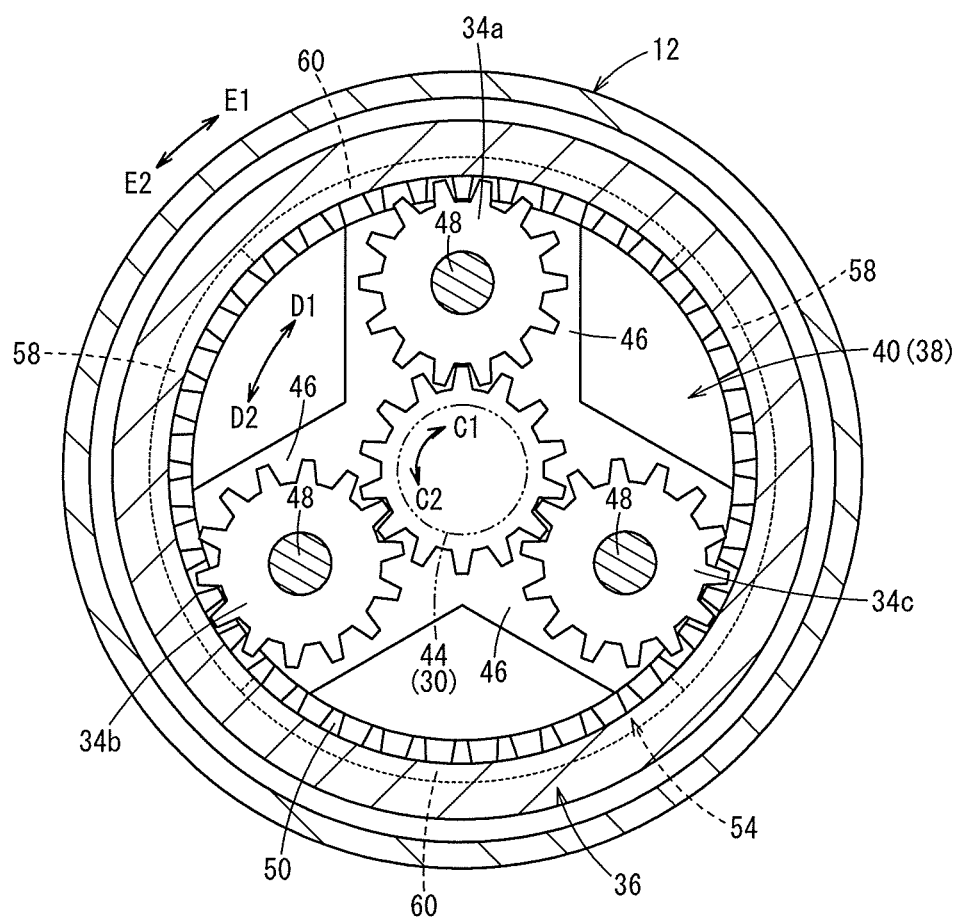
FIG. 5 is a cross sectional view taken along a line V-V in FIG. 3.

Firstly, a rotational driving force from a rotary drive source (not shown) is transmitted to the sun gear 32 through the input shaft 30. In the case described below, when viewed in a direction from the input shaft 30 to the output shaft 44 in the direction indicated by the arrow A in FIG. 3, as shown in FIG. 5, the rotational driving force rotates the input shaft 30 and the sun gear 32 clockwise (in a direction indicated by an arrow C1).

When the rotational force at low load is transmitted to the input shaft 30, by the rotational driving force transmitted from the sun gear 32, the three planetary gears 34a, 34b, 34c revolve around the sun gear 32 clockwise (in a direction indicated by an arrow D1) without rotating about their own axes. Accordingly, the internal gear 36 revolves clockwise (in a direction indicated by an arrow E1) as well. At this time, the magnetic flux guided from the first and second magnets 52, 54 provided for the internal gear 36 to the first and second carriers 38, 40 produce magnetic friction between the internal gear 36 and the first and second carriers 38, 40. By the magnetic braking force, the internal gear 36 and the first and second carriers 38, 40 are combined together.

Therefore, by revolution of the internal gear 36, the first and second carriers 38, 40 rotate together, and the rotational driving force inputted from the input shaft 30 is outputted from the output shaft 44 to the outside.

That is, in the case where a low load which is the rotational driving force inputted from the input shaft 30 is not more than a predetermined hysteresis torque, the internal gear 36 and the first and second carriers 38, 40 are coupled and rotate together by the magnetic braking force generated by the first and second magnets 52, 54.

Next, in the case where a high load which in excess of the predetermined hysteresis torque is applied to the second carrier 40 through the output shaft 44, the planetary gears 34a, 34b, 34c do not revolve by rotation of the sun gear 32, and the planetary gears 34a, 34b, 34c rotate about their own axes counterclockwise (in a direction indicated by an arrow D2) opposite to rotation of the sun gear 32, and the internal gear 36 in mesh with the planetary gears 34a, 34b, 34c rotates counterclockwise (in a direction indicated by an arrow E2).

That is, when the load which exceeds the hysteresis torque of the first and second magnets 52, 54 provided in the internal gear 36 and the first and second carriers 38, 40 made of a hysteresis material, by the load applied to the output shaft 44, the second carrier 40 formed integrally with the output shaft 44 and the first carrier 38 coupled to the second carrier 40 are decoupled from the internal gear 36 which has been coupled (joined) to the first and second carriers 38, 40 by the magnetic braking force, and the planetary gears 34a, 34b, 34c and the internal gear 36 in the form of helical gears generate a thrust force in a direction of the tooth trace formed helically, and the internal gear 36 moves toward the output shaft 44 in the axial direction (indicated by the arrow A).

As a result, the internal gear lock receiver 56b of the internal gear 36 and the second lock 28 of the second housing 14 are engaged with each other. Accordingly, the internal gear 36 is locked, and further movement and rotation of the internal gear 36 are restricted. That is, the internal gear lock receiver 56b of the internal gear 36 and the second lock 28 of the second housing 14 function as braking elements capable of restricting rotation of the internal gear 36.

In this manner, since the internal gear 36 is locked, while the planetary gears 34a, 34b, 34c rotate on their own axes counterclockwise (in the direction indicated by the arrow D2) by rotation of the sun gear 32 on its own axis clockwise (in a direction indicated by an arrow C1), and the internal gear 36, and the first and second carriers 38, 40 revolve around the sun gear 32 clockwise (in the direction indicated by the arrow D1). As a result, the decelerated rotation speed and the increased torque are transmitted to the output shaft 44 of the second carrier 40. It should be noted that the outputted torque is a force in correspondence with the gear ratio between the planetary gears 34a, 34b, 34c and the internal gear 36.

Next, in order to unlock the internal gear 36, the input direction of the rotational driving force inputted from the input shaft 30 is reversed. That is, since the sun gear 32 is rotated counterclockwise (in the direction indicated by the arrow C2) through the input shaft 30, while the planetary gears 34a, 34b, 34c rotate on their own axes clockwise (in the direction indicated by the arrow D1) by rotation of the sun gear 32, the internal gear 36 and the first and second carriers 38, 40 revolve on their own axes counterclockwise (in the direction indicated by the arrow E2). Then, when the sun gear 32 starts to rotate counterclockwise (in the direction indicated by the arrow C2), the internal gear 36 and the first and second carriers 38, 40 rotate together by the magnetic braking force. As shown in FIG. 1, the lockup is released, and the internal gear 36 and the first and second carriers 38, 40 return to their initial positions.

That is, after the internal gear 36 is unlocked, when the sun gear 32 is rotated counterclockwise (in the direction indicated by the arrow C2), the planetary gears 34a, 34b, 34c rotate counterclockwise (in the direction indicated by the arrow D2) without rotating on their own axes, and likewise, the internal gear 36 rotates counterclockwise on their own axes (in the direction indicated by the arrow E2).

Although the embodiment has been described in connection with the case where the input shaft 30 and the sun gear 32 rotates clockwise (in the direction indicated by the arrow C1), also in the case where the input shaft 30 and the sun gear 32 rotate counterclockwise (in the direction indicated by the arrow C2), the same operation and advantages are obtained.

That is, in the case where the input shaft 30 and the sun gear 32 rotate counterclockwise (in the direction indicated by the arrow C2), and in this state, a high load in excess of the predetermined hysteresis torque is applied to the first and second carriers 38, 40 through the output shaft 44, the internal gear lock receiver 56a of the internal gear 36 and the first lock 22 are engaged with each other, and the internal gear 36 is locked. The internal gear lock receiver 56a of the internal gear 36 and the first lock 22 of the first housing 12 function as braking elements capable of restricting rotation of the internal gear 36.

Moreover, by reversing the orientation of the rotational driving force to rotate the sun gear 32 clockwise (in the direction indicated by the arrow C1) through the input shaft 30, the internal gear 36 is unlocked, and returns to the initial position shown in FIG. 1.

On the other hand, when the internal gear 36 is locked, by decreasing the load applied to the output shaft 44, it is possible to unlock the internal gear 36. That is, in the state where the load applied to the output shaft 44 is decreased, by clockwise rotation of the sun gear 32 (in the direction indicated by the arrow C1), the planetary gears 34a, 34b, 34c rotate counterclockwise (in the direction indicated by the arrow D2) on their own axes, and at the same time, the internal gear 36, and the first and second carriers 38, 40 revolve together clockwise (in the direction indicated by the arrow E1), and the internal gear 36 in mesh with the planetary gears 34a, 34b, 34c rotate clockwise (in the direction indicated by the arrow E1).

Since the magnetic braking force is generated between the internal gear 36 and the first and second carriers 38, 40, and the planetary gears 34a, 34b, 34c and the internal gear 36 are helical gears, a thrust force is generated in the direction of the tooth trace formed helically on the gear cylindrical surface.

Figure 4:
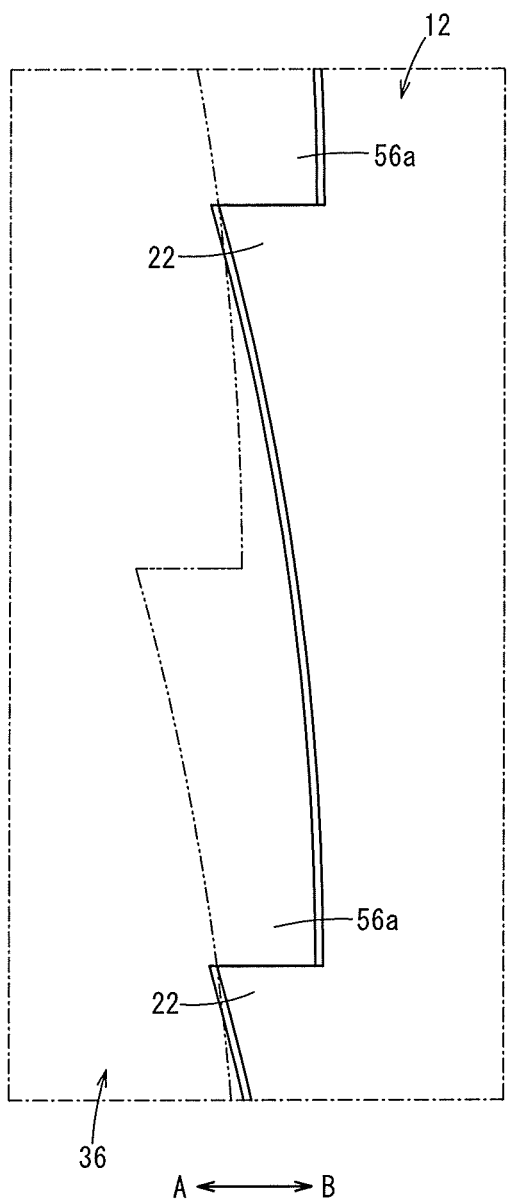
FIG. 4 is an enlarged side view showing a portion where an internal gear lock receiver of an internal gear and a first lock are engaged with each other.

Further, as shown in FIG. 4, since the internal gear lock receiver 56a and the first lock 22 have a shape of a curve drawn in the circumferential direction, when the internal gear 36 rotates clockwise (in the direction indicated by the arrow E1), a force is applied in addition to the thrust force, in a direction opposite to the direction indicated by the arrow A, and the internal gear 36 is translated. Specifically, the internal gear 36 rotates clockwise (in the direction indicated by the arrow E1), and at the same time, the internal gear 36 is translated toward the input shaft 30. The internal gear lock receiver 56b is spaced from the second lock 28, and the internal gear 36 is unlocked.

As described above, in the embodiment of the present invention, in the planetary gear mechanism 16 of the speed reduction ratio automatic switching device 10, helical gears are used as the sun gear 32, the planetary gears 34a, 34b, 34c and the internal gear 36, and the first and second magnets 52, 54 are provided between the first and second carriers 38, 40 and the internal gear 36. The first and second carriers 38, 40 are made of a magnetic material (hysteresis material) and hold the planetary gears 34a, 34b, 34c.

In the structure, in the case where a high load in excess of the predetermined hysteresis torque is applied to the first and second carriers 38, 40 through the output shaft 44, the first and second carriers 38, 40 which have been coupled to the internal gear 36 by the magnetic braking force is decoupled from the internal gear 36, the planetary gears 34a, 34b, 34c and the internal gear 36 comprising helical gears generate the thrust force in the direction of the tooth trace formed helically, and the internal gear 36 is translated toward the input shaft 30 or the output shaft 44 in the axial direction. In this manner, it is possible to automatically switch the speed reduction ratio of the rotational driving force outputted from the output shaft 44.

As a result, in comparison with the conventional reduction ratio automatic switching device where viscous resisting substance such as viscous oil or grease is provided between the planetary gears and the carriers, and between the planetary gears and the internal gear, since the magnetic braking force generated by the first and second magnets 52, 54 provided between the first and second carriers 38, 40 and the internal gear 36 is utilized, changes of the ambient environment such as temperature, humidity, etc. and performance changes due to degradation over time, etc. do not occur. Accordingly, it becomes possible to stably perform switching of the speed reduction ratio over the years at the desired switching point regardless of the ambient environment and/or the number of driving rotations of the speed reduction ratio automatic switching device 10.

Further, even in the case where the load applied to the output shaft 44 is changed, it becomes possible to unlock the internal gear 36 from the first housing 12 or the second housing 14, and switch the speed reduction ratio automatically. Thus, it is possible to output the driving force at low torque and at high speed.

The above planetary gear mechanism 16 has structure where the first and second magnets 52, 54 are provided on both sides in the axial direction, for the inner teeth 50 of the internal gear 36. However, the present invention is not limited in this respect. For example, only one of the first magnet 52 or the second magnet 54 may be provided. It may be possible to design the first magnet 52 and the second magnet 54 to have different magnetic characteristics.

The speed reduction ratio automatic switching device according to the present invention is not limited to the above embodiment. It is a matter of course that various structures may be adopted without departing from the gist of the present invention.

What is claimed is:

1. A speed reduction ratio automatic switching device capable of automatically switching a rotational driving force inputted to an input shaft at a predetermined speed reduction ratio to output the switched rotational driving force from an output shaft, the speed reduction ratio automatic switching device comprising:
   a planetary gear mechanism including a sun gear provided for the input shaft, a planetary gear in mesh with an outer circumferential side of the sun gear, an internal gear in mesh with an outer circumferential side of the planetary gear, and a carrier made of a hysteresis material, the carrier being coupled to the output shaft, configured to support the planetary gear in a rotatable manner, and rotate together with the planetary gear along with revolution of the planetary gear;
   a resisting element configured to generate a thrust force in an axial direction between the internal gear and the carrier; and
   a brake configured to restrict rotation of the internal gear when the internal gear moves in the axial direction by the thrust force, as a result of a change of output load applied to the output shaft,
   wherein each of the sun gear, the planetary gear, and the internal gear comprises a helical gear, and the resisting element comprises a magnet provided between the internal gear and the carrier, and
   wherein the resisting element is configured to generate the thrust force in the axial direction between the internal gear and the carrier when a load acting on the output shaft exceeds a hysteresis torque of the hysteresis material, and to not generate the thrust force in the axial direction between the internal gear and the carrier when a load of the input shaft does not exceed the hysteresis torque of the hysteresis material.

2. The speed reduction ratio automatic switching device according to claim 1, wherein the magnet is attached to an inner circumferential surface facing the carrier, and clearance is present between the magnet and the carrier.

3. The speed reduction ratio automatic switching device according to claim 1, wherein the magnet comprises a multipole permanent magnet having different poles along a circumferential direction of the internal gear.

4. The speed reduction ratio automatic switching device according to claim 1, wherein the magnet is provided adjacent to the internal gear in mesh with the planetary gear in an axial direction of the internal gear.

5. The speed reduction ratio automatic switching device according to claim 1, wherein the carrier is made of a semi-rigid magnetic material.

6. The speed reduction ratio automatic switching device according to claim 1, wherein the brake comprises:
   a lock provided in a housing configured to store the planetary gear mechanism; and
   an internal gear clutch provided at an end of the internal gear in an axial direction, and
   wherein the internal gear clutch is engaged with the lock to restrict, and lock rotation of the internal gear.

7. A speed reduction ratio automatic switching device capable of automatically switching a rotational driving force inputted to an input shaft at a predetermined speed reduction ratio to output the switched rotational driving force from an output shaft, the speed reduction ratio automatic switching device comprising:
   a planetary gear mechanism including a sun gear provided for the input shaft, a planetary gear in mesh with an outer circumferential side of the sun gear, an internal gear in mesh with an outer circumferential side of the planetary gear, and a carrier made of a hysteresis material, the carrier being coupled to the output shaft, configured to support the planetary gear in a rotatable manner, and rotate together with the planetary gear along with revolution of the planetary gear;
   a resisting element configured to generate a thrust force in an axial direction between the internal gear and the carrier; and
   a brake configured to restrict rotation of the internal gear when the internal gear moves in the axial direction by the thrust force, as a result of a change of output load applied to the output shaft,
   wherein each of the sun gear, the planetary gear, and the internal gear comprises a helical gear, and the resisting element comprises a magnet provided between the internal gear and the carrier, and
   wherein a first magnet part having an inner circumferential side magnetized to a south pole and an outer circumferential side magnetized to a north pole, and a second magnet part having an inner circumferential side magnetized to the north pole and an outer circumferential side magnetized to the south pole, are provided alternately along a circumferential direction.

* * * * *